United States Patent
Patel et al.

(10) Patent No.: US 12,344,226 B1
(45) Date of Patent: Jul. 1, 2025

(54) ADAPTIVE FEEDFORWARD CONTROL FOR CONTROLLING INPUT SPEED OF ELECTRIFIED POWERTRAINS WITH A TORQUE CONVERTER

(71) Applicant: FCA US LLC, Auburn Hills, MI (US)

(72) Inventors: Nadirsh D Patel, Auburn Hills, MI (US); Abdulquadri Oluwatobi Banuso, Auburn Hills, MI (US); Hangxing Sha, Auburn Hills, MI (US); Krishna Reddy Madireddy, Auburn Hills, MI (US); Indrasen Karogal, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/887,166

(22) Filed: Sep. 17, 2024

(51) Int. Cl.
| | | |
|---|---|---|
| B60W 10/08 | (2006.01) | |
| B60W 10/02 | (2006.01) | |
| B60W 10/06 | (2006.01) | |
| B60W 20/11 | (2016.01) | |
| B60W 30/18 | (2012.01) | |

(52) U.S. Cl.
CPC .......... *B60W 20/11* (2016.01); *B60W 10/024* (2020.02); *B60W 10/026* (2013.01); *B60W 10/06* (2013.01); *B60W 10/08* (2013.01); *B60W 30/18063* (2013.01); *B60W 2510/0208* (2013.01); *B60W 2510/10* (2013.01); *B60W 2510/1015* (2013.01); *B60W 2710/028* (2013.01); *B60W 2710/0666* (2013.01); *B60W 2710/083* (2013.01); *B60W 2710/1022* (2013.01)

(58) Field of Classification Search
CPC ................. B60W 20/11; B60W 10/08; B60W 2710/083; B60W 30/1803; B60W 20/17; B60W 2510/1015; B60W 2510/10; B60W 2510/0208; B60W 2710/028; B60W 10/024
USPC ................................................ 477/3; 701/22
See application file for complete search history.

(56) References Cited

U.S. PATENT DOCUMENTS

| | | |
|---|---|---|
| 11,007,878 B2 | 5/2021 | Kamino et al. |
| 11,254,299 B2 | 2/2022 | Jungaberle et al. |
| 11,440,418 B2 | 9/2022 | Otsubo et al. |

(Continued)

FOREIGN PATENT DOCUMENTS

| | | |
|---|---|---|
| JP | 6157829 | 7/2017 |

*Primary Examiner* — Roger L Pang
(74) *Attorney, Agent, or Firm* — Jeremy J. Klobucar

(57) ABSTRACT

An adaptive feedforward control method for an electrified powertrain including a torque converter includes determining a desired input speed for a torque converter based on the set of operating parameters of the electrified powertrain, determining minimum and maximum torques for an impeller of the torque converter based on the set of operating parameters of the electrified powertrain, determining a raw feedforward torque for the torque converter impeller based on the desired input speed for the torque converter and a speed of a turbine of the torque converter, determining a final feedforward torque for the torque converter impeller based on the raw feedforward torque for the torque converter impeller and the minimum and maximum torques for the torque converter impeller, and controlling an electric motor of the electrified powertrain based on the final feedforward torque for the torque converter impeller.

16 Claims, 5 Drawing Sheets

(56) References Cited

U.S. PATENT DOCUMENTS

| | | |
|---|---|---|
| 11,904,837 B2 | 2/2024 | Takada et al. |
| 2014/0162838 A1* | 6/2014 | Doering .................. B60K 6/38 180/65.265 |
| 2016/0052517 A1* | 2/2016 | Connolly .............. B60W 20/19 180/65.265 |
| 2018/0050609 A1* | 2/2018 | Meyer .................. B60W 10/08 |

* cited by examiner

ADAPTIVE FEEDFORWARD CONTROL FOR CONTROLLING INPUT SPEED OF ELECTRIFIED POWERTRAINS WITH A TORQUE CONVERTER

FIELD

The present application generally relates to electrified vehicles and, more particularly, to adaptive feedforward control techniques for controlling input speed of electrified powertrains with a torque converter.

BACKGROUND

Vehicle "creep" acceleration is a control problem where the primary goal is to maintain a steady forward torque at a constant speed to prevent the vehicle's actuators from stalling while in a drive mode. This is achieved by regulating the torque from the primary actuator based on a desired transmission input speed, which in turn ensures the vehicle maintains the intended creep speed and corresponding acceleration. This process is crucial for the smooth operation of the vehicle at low speeds or when initiating movement from a stationary position. In electrified powertrains with a torque converter, an optimal load torque at the torque converter's input is crucial for efficient operation. Conventional solutions to compute this optimal load torque include (i) heuristic techniques, which require high calibration effort, and (ii) modeling from wheel to actuator, which does not account for variations that eventually wind-up a closed-loop controller. Accordingly, while these conventional solutions do work for their intended purpose, there exists an opportunity for improvement in the relevant art.

SUMMARY

According to one aspect of the invention, an adaptive feedforward control system for an electrified powertrain including a torque converter is presented. In one exemplary implementation, the system comprises a set of sensors configured to monitor a set of operating parameters of the electrified powertrain, wherein the electrified powertrain includes an electric motor connected to an impeller of the torque converter and a transmission connected between a turbine of the torque converter and a driveline and a control system configured to determine a desired input speed for the torque converter based on the set of operating parameters of the electrified powertrain, determine minimum and maximum torques for the torque converter impeller based on the set of operating parameters of the electrified powertrain, determine a raw feedforward torque for the torque converter impeller based on the desired input speed for the torque converter and a speed of the torque converter turbine, determine a final feedforward torque for the torque converter impeller based on the raw feedforward torque for the torque converter impeller and the minimum and maximum torques for the torque converter impeller, and control the electric motor based on the final feedforward torque for the torque converter impeller.

In some implementations, the control system is configured to determine the final feedforward torque for the torque converter impeller as a maximum of (i) the minimum torque for the torque converter impeller and (ii) a minimum of (a) the raw feedforward torque for the torque converter impeller and (b) the maximum torque for the torque converter impeller. In some implementations, the electrified powertrain further comprises an engine and a disconnect clutch that selectively connects the engine in series with the electric motor, and wherein the set of operating parameters includes a state of the disconnect clutch. In some implementations, the set of operating parameters further includes a state of the transmission and one or more shaft speeds or torques of the electrified powertrain.

In some implementations, the control system is further configured to generate and maintain an adaptive feedforward torque converter (FTC) map or model using a Kalman filter. In some implementations, the control system is configured to utilize the adaptive FTC map or model to determine the raw feedforward torque for the torque converter impeller as a function of the speed of the torque converter turbine and the desired input speed for the torque converter. In some implementations, the control system is configured to control the electric motor based on the final feedforward torque for the torque converter impeller to provide optimal positive creep torque by the electrified powertrain. In some implementations, one of the set of operating parameters of the electrified powertrain is the enablement or activation of a creep mode.

According to another aspect of the invention, an adaptive feedforward control method for an electrified powertrain including a torque converter is presented. In one exemplary implementation, the method comprises monitoring, by a control system and using a set of sensors, a set of operating parameters of the electrified powertrain, wherein the electrified powertrain includes an electric motor connected to an impeller of the torque converter and a transmission connected between a turbine of the torque converter and a driveline, determining, by the control system, a desired input speed for the torque converter based on the set of operating parameters of the electrified powertrain, determining, by the control system, minimum and maximum torques for the torque converter impeller based on the set of operating parameters of the electrified powertrain, determining, by the control system, a raw feedforward torque for the torque converter impeller based on the desired input speed for the torque converter and a speed of the torque converter turbine, determining, by the control system, a final feedforward torque for the torque converter impeller based on the raw feedforward torque for the torque converter impeller and the minimum and maximum torques for the torque converter impeller, and controlling, by the control system, the electric motor based on the final feedforward torque for the torque converter impeller.

In some implementations, the determining of the final feedforward torque for the torque converter impeller includes determining a maximum of (i) the minimum torque for the torque converter impeller and (ii) a minimum of (a) the raw feedforward torque for the torque converter impeller and (b) the maximum torque for the torque converter impeller. In some implementations, the electrified powertrain further comprises an engine and a disconnect clutch that selectively connects the engine in series with the electric motor, and wherein the set of operating parameters includes a state of the disconnect clutch. In some implementations, the set of operating parameters further includes a state of the transmission and one or more shaft speeds or torques of the electrified powertrain.

In some implementations, the method further comprises generating and maintaining, by the control system, an adaptive FTC map or model using a Kalman filter. In some implementations, the method further comprises utilizing the adaptive FTC map or model to determine the raw feedforward torque for the torque converter impeller as a function of the speed of the torque converter turbine and the desired input speed for the torque converter. In some implementations, the controlling of the electric motor based on the final feedforward torque for the torque converter impeller provides optimal positive creep torque by the electrified powertrain. In some implementations, one of the set of operating parameters of the electrified powertrain is the enablement or activation of a creep mode.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
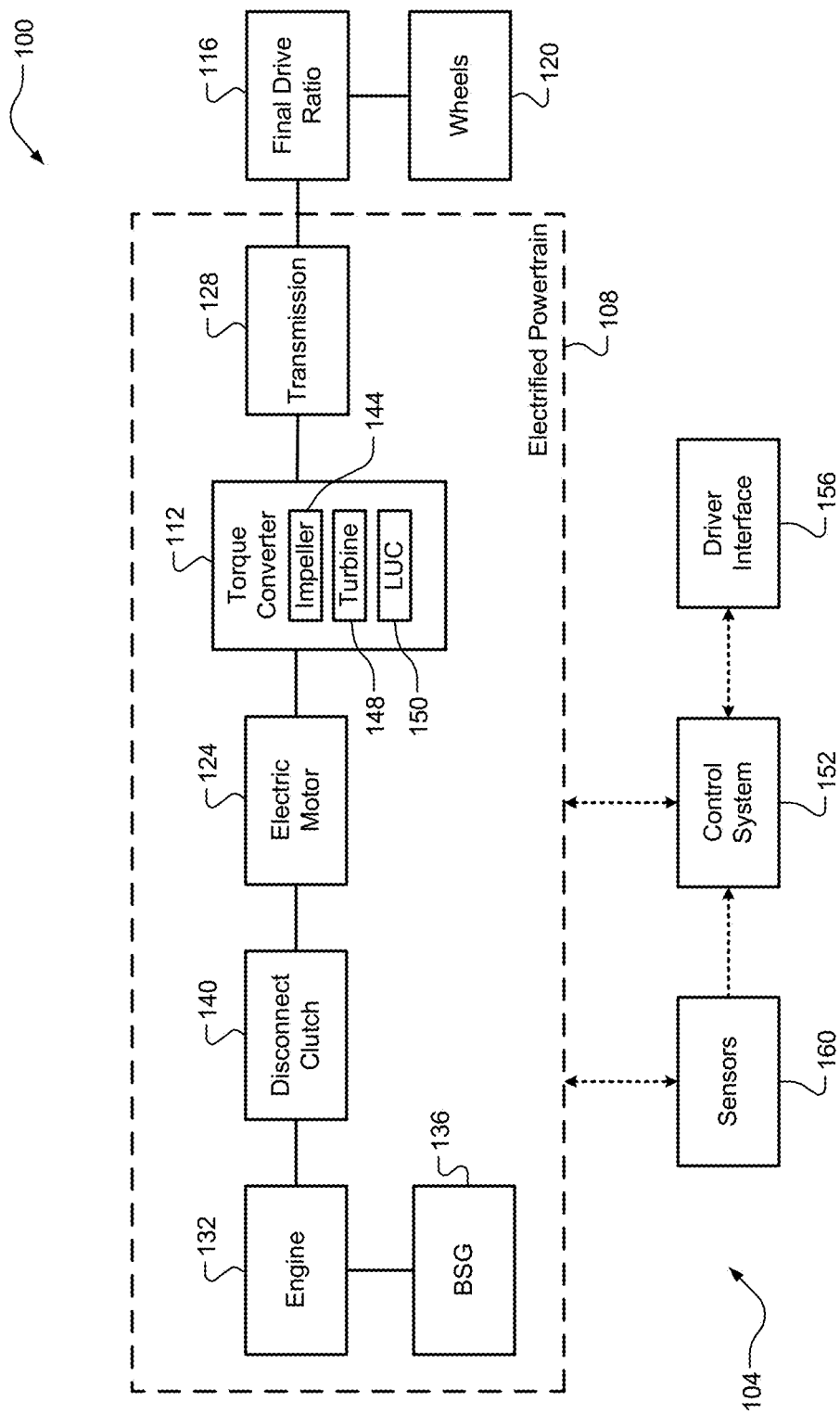
FIG. 1 is a functional block diagram depicting an example electrified powertrain including a torque converter and an example adaptive feedforward control system according to the principles of the present application.
Figure 2:
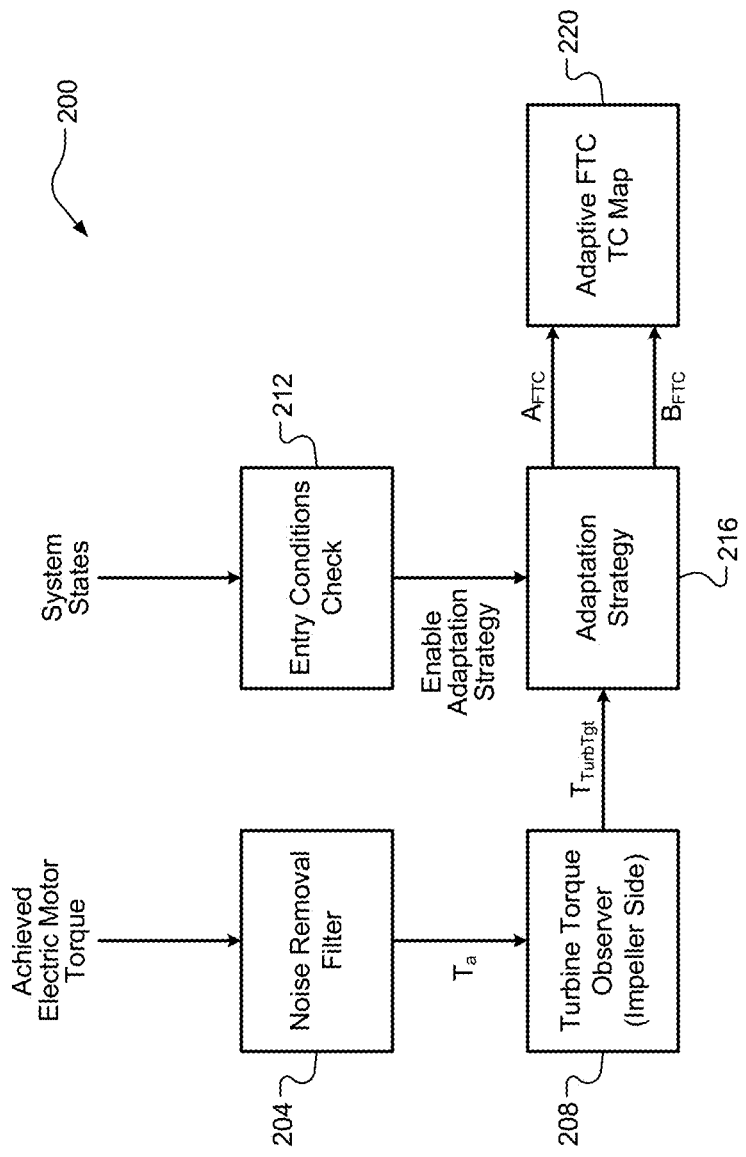
FIG. 2 is a functional block diagram depicting an example control architecture for the adaptive feedforward control system according to the principles of the present application.

As previously discussed, vehicle "creep" acceleration is a control problem where the primary goal is to maintain a steady forward torque at a constant speed to prevent the vehicle's actuators from stalling while in a drive mode. This is achieved by regulating the torque from the primary actuator based on a desired transmission input speed, which in turn ensures the vehicle maintains the intended creep speed and corresponding acceleration. This process is crucial for the smooth operation of the vehicle at low speeds or when initiating movement from a stationary position. In electrified powertrains with a torque converter, an optimal load torque at the torque converter's input is crucial for efficient operation. This involves using an adaptive control structure with the torque converter's characteristics within a feedforward control loop, alongside a feedback controller. The goal is to regulate the input speed to match the target speed. Therefore, a sophisticated control algorithm is needed to compute the optimal load torque command at the torque converter's input, factoring in the nonlinear behavior of the torque converter and the primary actuator's response.

One conventional solution to this problem focuses solely on using heuristics techniques for the development of a torque converter model for feedforward control and a proportional-integral-derivative (PID) controller for feedback control of the actuator input speed to target transmission input speed. Heuristic strategies require a high calibration effort, and several conditions and rules might be needed to generate a torque converter map with satisfactory performance for all working conditions as part of a feedforward control loop. In addition, a simple PID does not consider the actual dynamics of the system, and due to the non-linearity of the powertrain and the torque converter, a heavily tuned feedback controller is needed which can significantly increases closed loop effort and typically leads to bad anti windup control. Other conventional methods have tried to model the system from the wheel to actuator. When modelling from wheel to actuator, they do not account for variations in road load, vehicle inertia, mass, transmission elements which eventually winds up the closed loop controller.

Accordingly, adaptive feedforward control techniques for controlling the input speed of an electrified powertrain with a torque converter are presented herein. These techniques employ an adaptive algorithm to dynamically adjust the torque converter's characteristics map (a forward torque converter, or FTC model) in response to changing conditions of the powertrain. This adapted torque converter characteristics map is then used in the generation of an optimal feedforward control torque command, enabling the actuator to reach the desired speed efficiently while reducing the feedback control effort, which can improve the overall performance and responsiveness of the powertrain system. By utilizing a dynamic feedforward control approach, that takes into the actuator achieved torque, adaptive torque converter characteristics map, torque ratio, actuator-torque converter inertia-torque dynamics, we can control the input speed of the primary actuator to deliver vehicle creep acceleration. By utilizing a dynamic feedforward approach with an adaptive control structure, the actuator has an improved response to tracking desired input speed and acceleration whilst providing a better drivability feel for creep controls from repeatability and consistency standpoint and less close loop, windup control with very good disturbance rejection.

There are also other benefits resulting from the techniques of the present application. These techniques enhance the performance and responsiveness of automotive powertrains, potentially improving fuel efficiency and driving experience. The adaptive algorithms in a torque control system also enhance the system and the ability to handle variability and uncertainty, ensuring optimal performance across a range of operating conditions which is ideal for applications in automotive powertrain systems where operating conditions can vary widely and unpredictably. In addition by considering the operating conditions of the powertrain, adaptive torque converter characteristics map and the achieved torque of the primary actuator, these techniques take advantage of the system model system, which are used to determine an optimal load torque front feedforward command thus providing a higher level of overall torque management on the powertrain. For the user, this means potential drivability improvements and consistent feel to different creep maneuvers with varying speed targets. Lastly, compared to previous solutions, the calibration effort is drastically reduced as the dynamic of the system are captured within the model used.

Referring now to FIG. 1, a functional block diagram of an electrified vehicle 100 having an example adaptive feedforward control system 104 for an electrified powertrain 108 including a torque converter 112 according to the principles of the present application is illustrated. The electrified powertrain 108 is configured to generate and transfer drive torque to a driveline (e.g., a final drive ratio 116 and wheels 120) for propulsion. As shown, the electrified powertrain 108 includes an electric motor 124 (e.g., a three-phase traction motor) connected to a transmission 128 (a multi-speed step gear transmission, a continuously variable transmission, etc.) with the torque converter 112 therebetween. The electrified powertrain 108 further includes an internal combustion engine 132 having a belt-driven starter-generator (BSG) system 136 coupled thereto (e.g., for engine stop-start control) with a disconnect or separation clutch 140 arranged between the electric motor 124 and the engine 132. While a series hybrid configuration is shown, it will be appreciated that the electrified powertrain 108 could have another suitable configuration that includes the torque converter 112. Speeds/torques of the various shafts of the electrified powertrain 108, as well as other suitable parameters (pressures, temperatures, etc.) and states of various devices (clutches, the transmission 128, etc.) are monitored by a set of sensors 160.

The torque converter 112 is a fluid coupling where an impeller 144 is driven by the electric motor 124, and the impeller 144 in turn drives a turbine 148 that is connected to the transmission 128. When the speeds of the impeller 144 and the turbine 148 are synchronized, a lock-up clutch (LUC) 150 can be engaged to physically connect the impeller 144 and the turbine 148. A controller or control system 152 controls operation of the electrified powertrain 108, which primarily includes controlling the electrified powertrain 108 to generate a desired amount of drive torque to satisfy a driver torque request (e.g., received via a driver interface 156, such as an accelerator pedal). The control system 152 also receives measured operating parameters, such as speeds/torques of the various rotating shafts and systems states (disconnect clutch state, transmission state, etc.). The control system 152 is configured to execute an adaptive algorithm to dynamically adjust the torque converter's characteristics map (a forward torque converter, or FTC model) in response to changing conditions of the electrified powertrain. The control system 152 is also configured to perform the adaptive feedforward control techniques of the input speed to the torque converter 112, which will now be discussed in greater detail below.

Referring now to FIGS. 2, 3, and 4A-4B and with continued reference to FIG. 1, functional block diagram depicting example system architectures 200, 400, 450 and a plot 300 of an example use case for the adaptive feedforward control system 104 according to the principles of the present application are illustrated. As previously discussed, the system 104 leverages an adapted torque converter characteristics map, which is then used in the generation of an optimal feedforward control torque command, enabling the actuator (the electric motor 124) to reach the desired speed efficiently while reducing the feedback control effort, which can improve the overall performance and responsiveness of the electrified powertrain 108. By utilizing a dynamic feedforward control approach, that takes into the electric motor's achieved torque, the adaptive torque converter characteristics map, the torque converter's torque ratio, and the electric motor-torque converter inertia-torque dynamics, we can control the input speed of the electric motor 124 to deliver vehicle creep acceleration.

A filter 204 is used to remove the noise from the achieved electric motor torque ($T_a$) to provide a smooth torque response and for determining a turbine torque target ($T_{TurbTgt}$) to adapt the torque converter model towards, which is provided by a turbine torque observer 208 (from an impeller-side reference). By removing unwanted noise from the achieved electric motor torque signal, this filter 204 ensures that the output torque is smooth and consistent. This is particularly important where even minor fluctuations can lead to significant errors in the system's response. System states, such as the state of disconnect clutch 140 and a state of the transmission 128 (gear ratio, shift in-progress, etc.), are used as entry conditions by block 212 for enabling the adaptation framework. Electric motor torque $T_a$ and input and output speeds of the torque converter are determined with an estimation algorithm. The parameters of the torque converter (TC) map are online identified and adapted with a Kalman filter using the torque converter inertia-torque dynamics to the varying operating conditions of the powertrain 108.

Figure 3:
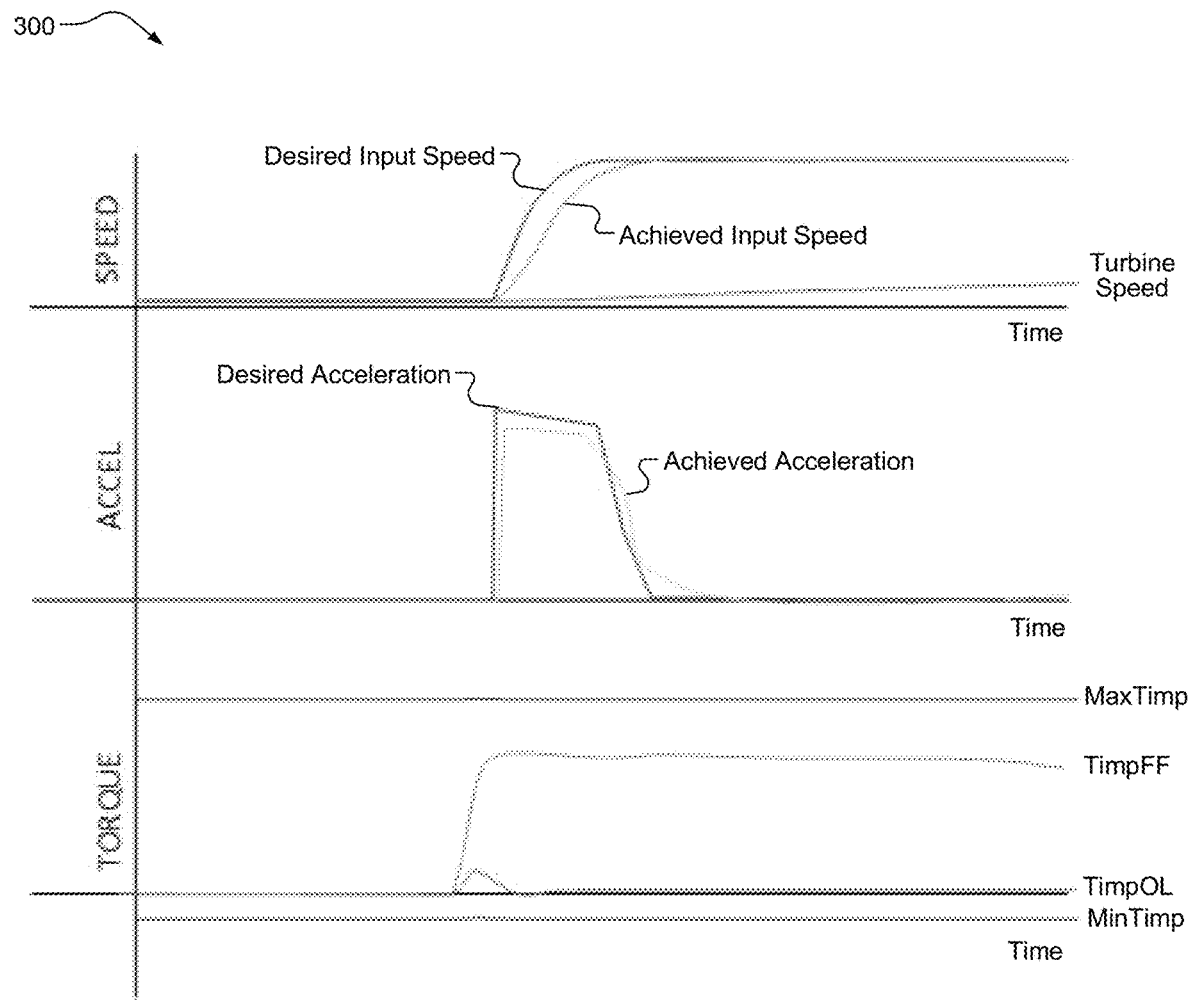
FIG. 3 is a plot depicting an example use case of the adaptive feedforward control method of an electrified powertrain including a torque converter according to the principles of the present application.

When the vehicle state is a creep mode (e.g., transmission in forward drive and no driver input via the brake/accelerator pedals), a desired transmission input speed is defined (NiProf) by a clutch control module 454. Using the adapted FTC characteristics TC map 220, a dynamic desired impeller torque of the actuator based on the desired input speed and actual turbine speed of the torque converter 112 (TimpOL). An optimal feedforward actuator torque is determined by utilizing the adapted torque converter map 462 and a torque demand from a torque demand module 458, which is minimum limited with the maximum transmission input torque (MaxTimp) and maximum limited with the minimum transmission input torque (MinTimp). A use case shown in the plot 300 of FIG. 3 illustrates a vehicle creep maneuver, where the clutch control module determines the desired input speed of the actuator at the input of the torque converter 112, with the turbine speed slowly increasing. A desired input speed (NiProf) is commanded, in which the actual speed sufficiently tracks with feedforward module described above delivering most of the torque command (TimpFF) with a minimal feedback control effort (TimpCL).

The techniques described herein model the torque converter 112 using polynomial equations that will relate its output torque or turbine torque to the slip of the torque converter 112 at a certain turbine speed. This approach is further enhanced with online parameter estimation to consider part variability, time changing effects such as temperature wear and tear of the components, transmission fluid viscosity etc. One unique aspect of the solution is the modeling approach using a polynomial fit, that can then be extended towards coefficient adaption to enable its use across a wide spectrum of vehicles. The dyno data of a torque converter 112 is processed with a wide range of impeller-turbine speeds to reveal the polynomial relationship between the turbine torque and positive slip speed ($N_c$) at certain turbine speed ($N_{turbine}$) for the forward model. The polynomial fit accuracy is above 99.9%. The accuracy result indicates that it is reliable to use the equation:

$$T_{turbine} = A*N_c^2 + B*N_c \qquad (1),$$

where $T_{turbine}$, A, B and $N_c$ represent turbine torque, the coefficients of the torque converter 112 and they are function of turbine speed and slip speed, respectively.

To enhance the performance in static optimization requires the most accurate and current torque converter model. This is crucial for determining the optimal input speed needed. In dynamic optimization, especially for creep control within a feedforward-feedback control system, it is essential to calculate the transmission input actuator torque based on wheel input, considering various hybrid configurations that include a torque converter. With the updated A, B coefficients and polynomial equations, the torque path torque converter ring is calculating impeller torque and lock-up clutch torque based on the slip speed. With the more accurate forward torque converter model, more accurate lock up clutch torque is calculated, and it is further used to determine the actual status of the lock up clutch 150. And the reverse torque converter model is derived as:

$$N_c = \left\{ \frac{-B}{2A} + \sqrt{\frac{T_{Turb} + \frac{B^2}{4A}}{A}} \quad \text{or} \quad \frac{-B}{2A} - \sqrt{\frac{T_{Turb} + \frac{B^2}{4A}}{A}} \right\} \quad (2)$$

A Kalman filter 408 is chosen as the optimum filter due to its robustness to measurement variance. Impeller speed Nimp and turbine speed Nturb are used as inputs. A target turbine torque module 404 outputs a target turbine torque ($T_{TurbTgt}$). The adaptation strategy with a torque trajectory is generated for the FTC adaptation. Based on a prediction module 416 and a correction module 420 shown, the coefficients are identified with the Kalman filter (KF) 408. A and B coefficients are calculated at the current operating points and are used as inputs to directly update the adaptive FTC look-up table 412.

With the standard parameter measurement output model defined as: $y=H\theta_k$ and the FTC model defined in equation (1), a mathematical relationship is expressed between the measurement output model and the FTC model as follows:

$$T_{turbine} = [N_c^2 \quad N_c] \begin{bmatrix} A \\ B \end{bmatrix} \quad (3)$$
$$y = H\theta_k$$
$$y = T_{turbine}$$
$$H = [N_c^2 \quad N_c]$$
$$\theta = [A \quad B]^T$$

where H represents the measurement function and θ represents the parameters. This adaptation strategy is setup to minimize the following objective problem:

$$J = \Sigma_{i=1}^M (y_k - \hat{y}_k)^2, \quad \hat{y}_k = H\hat{\theta}_k \quad (4),$$

where, J=cost function, ŷ=estimated output at the time step, k, and y=current output at the time step, k. To implement a KF based parameter estimation algorithm with the cost function defined in equation (4), the KF is written to recognize the parameters of the dynamic polynomial FTC model as the states defined above, which is achieved by rewriting the state transition matrix and measurement output model as follows:

$$\theta_{k+1} = \theta_k + w_k, \quad y_k = H\theta_k + v_k \quad (5),$$

where, $w_k$, represents the system uncertainties with covariance matrix, $Q_k = E[(w_{(k)}w_k^T)]$ and $v_k$ is the measurement noise with covariance matrix $R_k = E[(v_k v_k^T)]$ which are presented as diagonal matrices of appropriate dimensions.

The parameters of the covariance matrices have an excessive influence on the response and KF convergence to true estimates, since the $Q_k$ indicates how much confidence is in initial parameter estimates and the $R_k$ indicates how much trust is in the measurement model $y_k$. The covariance matrices are typically manually iteratively tuned, which takes a lot of time and effort, but a better idea is to tune them using a swarm intelligence-based optimization algorithms, such as the particle swarm optimization and ant colony optimization. As discussed above, the Kalman filter 408 can be broken down into prediction and correction modules 416 and 420. The Kalman filter 408 algorithm is initialized and recursively calculates parameter estimates, $\hat{\theta}_k$, at every sampling step with the prediction and correction steps, which is then used to adapt the parameters of the FTC model in the adaptive FTC lookup table 412 at the current operating points.

A mathematical model is established to represent the polynomial relationship between turbine torque and slip speed. The mathematical model is used in an FTC model to calculate current impeller torque based on known input speed and turbine speed and a reverse torque converter model to calculate target input speed to deliver driver torque request. The parameters of the polynomial torque converter model are online identified with a Kalman filter 408 to adapt the model to the varying transient operating conditions of the powertrain. General steps used for torque converter adaptation will now be described. In general, all these steps are done in real-time in an efficient manner by the control system 152. First, a base torque converter sequence is carried out including generating steady-state torque converter parameters. Next, data preprocessing and selection for model generation is carried out. The polynomial model is then trained using least squares regression rules. Finally, the A and B coefficients of the FTC are updated (see block 220). The steady-state torque converter parameters are generated based on the dynamics of the torque converter 112.

Inputs can include, but are not limited to: desired turbine speed range, input speeds, desired speed ratio range (up to 1), K factor map, torque ratio (TR) map based on desired speed ratio range. Outputs can include, but are not limited to: map of impeller and turbine torque as a function of input speed and speed ratio maximum limited to actual physical maximum impeller and turbine torque achievable by the torque converter specifications, interpolated slip speed across turbine speed range. For the data preprocessing and selection for model generation step, the input include, but are not limited to: impeller and turbine torque map, input and turbine speeds range, slip speed range at different turbine speeds. For the training step, the model is optimized. Model is tuned to increase observability and robustness and reduce overfitting. The estimation is evaluated on untrained data to evaluate estimation performance. If certain performance thresholds (estimation performance, mean squared performance, etc.) are not satisfactory, the method returns to the previous model tuning step. Adaptation steps will now be described. The steps include a turbine torque observer, an entry conditions check, an adaptation process, and an updating of the A and B coefficients of the FTC.

For the turbine torque observer 208, the inputs can include, but are not limited to: turbine speed, input speed, input torque, torque ratio map as a function of input and turbine speed. The output can include the turbine torque target. For the entry conditions check 212, the inputs can include a clutch status, a speed ratio, a transmission status check (shifter in "drive", transmission not undergoing a shift), turbine torque target >0 with hysteresis. The outputs can include enable/disable adaption process. In the adaptation process, the turbine speed row search is used to find an upper and lower index that can be used as part of the measurement model formulation. The measurement model formulation is defined in relation to the FTC model. The estimation algorithm (e.g., Kalman filter) is used to estimate A and B coefficients based on turbine torque target and slip speed ($N_c$). Protection functions are carried out. For example, Y1>Y2>Y3 and quadratic gradient rules are used to determine constraints for the updated A and B curves that are quadratic and unique at different turbine speeds. The quadratic rule checks the minimum of the line to confirm that it is less than 0 if the A coefficient is less than 0 which represents an upward opening curve. If the A coefficient is positive, then it is a downward opening curve. The maximum point is evaluated to confirm that it is greater than the "box" maximum so the window of slip speed is not crossed. The FTC is updated with updated A and B coefficients to determine turbine speed. The outputs include A and B coefficients of the FTC.

Figure 4A:
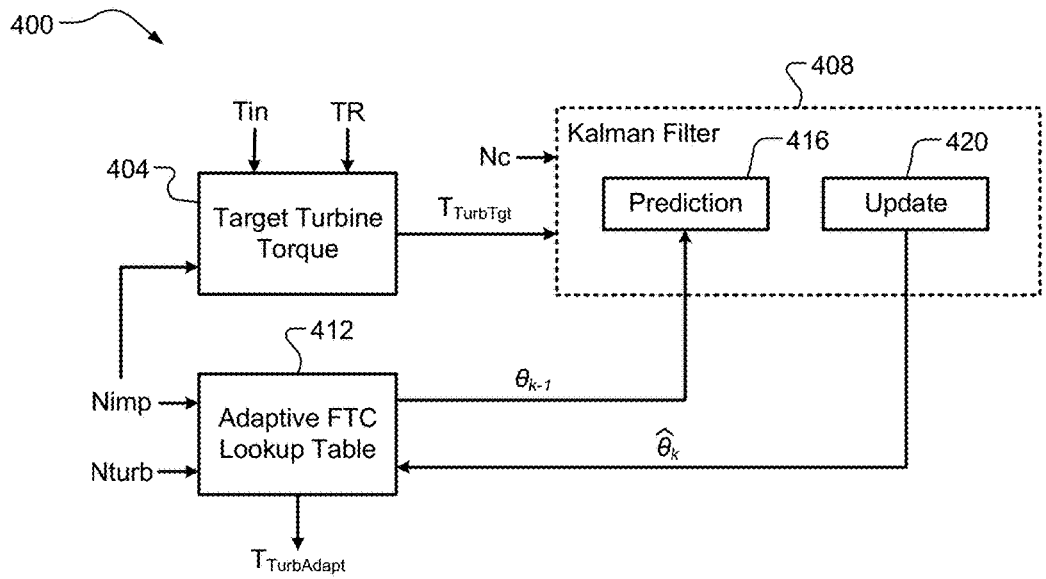
FIGS. 4A-4B are functional block diagrams depicting other example control architectures for the adaptive feedforward control system according to the principles of the present application.
Figure 4B:
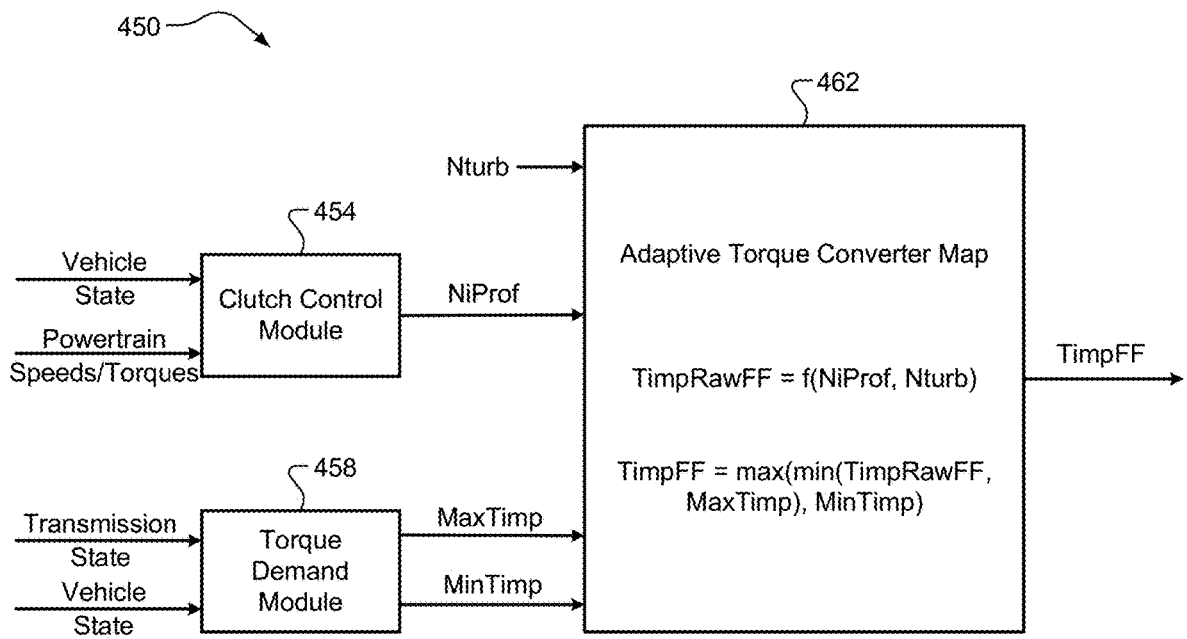

In FIG. 4B, the illustrated subsystem 450 adopts a feedforward control approach for transmission input torque determination. The clutch control module 454 determines a desired input speed (NiProf) based on the vehicle state and other powertrain speeds/torques as discussed herein. The torque demand module 458 determines minimum and maximum impeller torques (MinTimp, MaxTimp) based on the transmission state and other vehicle states (e.g., clutch states). The turbine speed (Nturb), the desired input speed NiProf, and the minimum and maximum impeller torques MinTimp, MaxTimp are all fed to the adaptive torque converter map 462, which executes the adaptive feedforward control strategy as illustrated. This includes calculating the raw feedforward impeller torque (TimpRawFF) as a function of the desired input speed NiProf and the turbine speed Nturb and then calculating the feedforward impeller torque (TimpFF) as a maximum of a minimum of the raw feedforward impeller torque TimpRawFF and the minimum and maximum impeller torques MinTimp, MaxTimp. The calculated feedforward impeller torque TimpFF can then be utilized for feedforward control of the input torque to the torque converter 112 (e.g., the electric motor's output torque) for optimized creep control.

Figure 5:
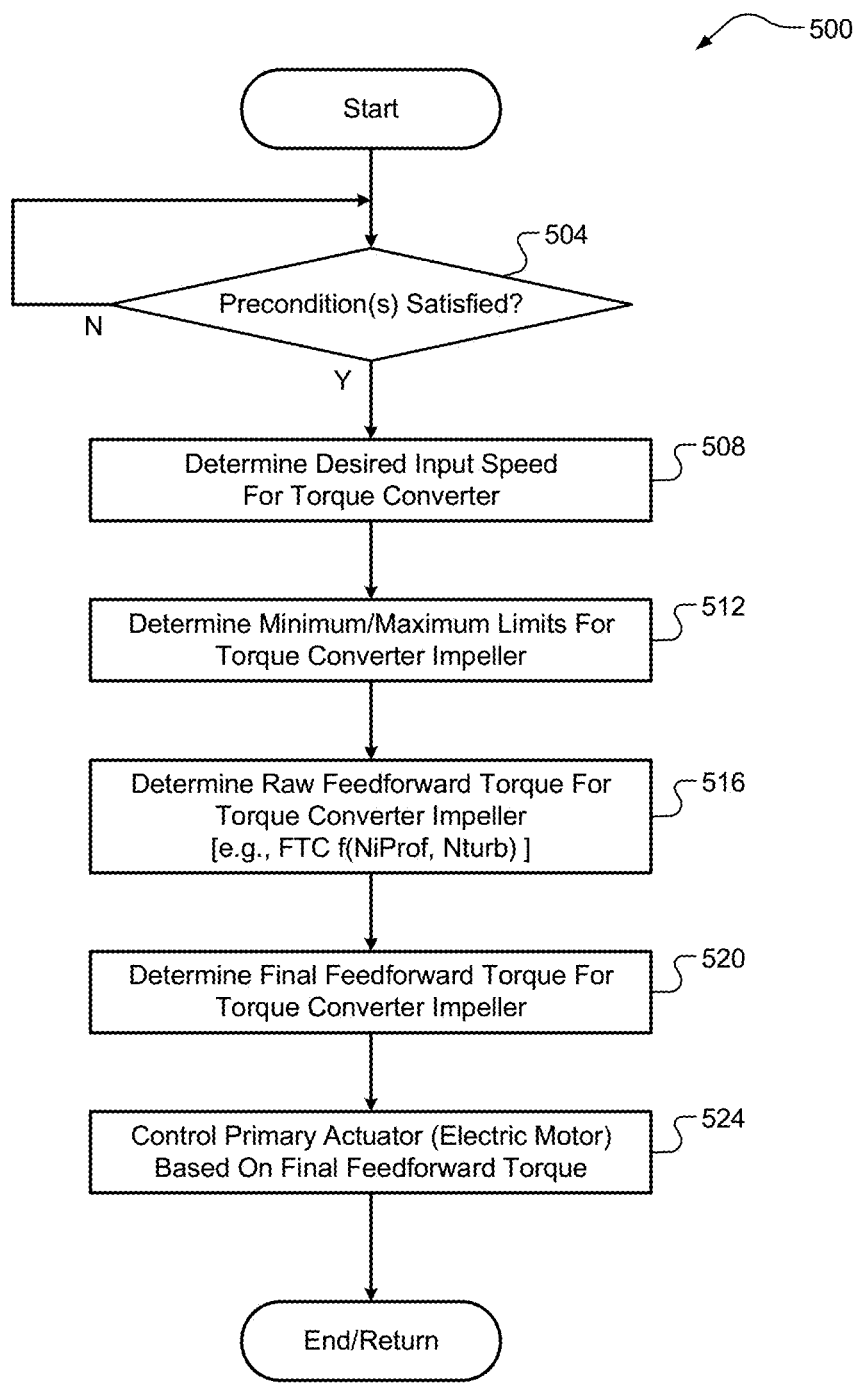
FIG. 5 is a flow diagram depicting an example adaptive feedforward control method of an electrified powertrain including a torque converter according to the principles of the present application.

Referring now to FIG. 5, a flow diagram depicting an example adaptive feedforward control method 500 for an electrified powertrain including a torque converter according to the principles of the present application is illustrated. While the electrified powertrain 108 and its components are specifically referenced for descriptive/illustrative purposes, it will be appreciated that the method 500 could be applicable to any suitable configured electrified powertrain having a torque converter. The method 500 begins at optional 504 where it is determined whether one or more optional preconditions are satisfied. These precondition(s) could include, for example only, the vehicle 100 being powered up and the electrified powertrain 108 being operational and there being no malfunctions or faults present that would negatively affect or otherwise impact the operation of the techniques of the present application. In one exemplary implementation, one of the precondition(s) could be the vehicle being in a creep mode where a desired positive creep torque is to be provided. When false, the method 500 ends or returns to 504. When true, the method 500 proceeds to 508.

At 508, the control system 152 determines the desired input speed (NiProf) for the torque converter 112 based on a set of powertrain speeds/torques and the vehicle state (e.g., a state of disconnect clutch 140). At 512, the control system 152 determines minimum and maximum torques (MinTimp, MaxTimp) for the impeller 144 of the torque converter 112 based on a state of the transmission 128 connected to the turbine 148 of the torque converter 112 and the vehicle state. At 516, the control system 152 determines a raw feedforward torque (TimpRawFF) for the impeller 144 using an adaptive FTC model, the desired input speed NiProf for the torque converter 112, and a speed of the turbine 148 (Nturb). At 520, the control system 152 determines a final feedforward torque (TimpFF) for the impeller 144 based on the raw feedforward torque TimpRawFF and the minimum and maximum impeller torques MinTimp, MaxTimp. At 524, the control system 152 performs feedforward control of the input speed (e.g., the electric motor 124) to the torque converter 112 based on the final feedforward impeller torque TimpFF to provide the optimal creep control. This could also further include small feedback control loop adjustments as shown in FIG. 3. The method 500 then ends or returns to 504.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An adaptive feedforward control system for an electrified powertrain including a torque converter, the system comprising:
 a set of sensors configured to monitor a set of operating parameters of the electrified powertrain, wherein the electrified powertrain includes an electric motor connected to an impeller of the torque converter and a transmission connected between a turbine of the torque converter and a driveline; and
 a control system configured to:
  determine a desired input speed for the torque converter based on the set of operating parameters of the electrified powertrain;
  determine minimum and maximum torques for the torque converter impeller based on the set of operating parameters of the electrified powertrain;
  determine a raw feedforward torque for the torque converter impeller based on the desired input speed for the torque converter and a speed of the torque converter turbine;
  determine a final feedforward torque for the torque converter impeller based on the raw feedforward torque for the torque converter impeller and the minimum and maximum torques for the torque converter impeller; and
  control the electric motor based on the final feedforward torque for the torque converter impeller.

2. The system of claim 1, wherein the control system is configured to determine the final feedforward torque for the torque converter impeller as a maximum of (i) the minimum torque for the torque converter impeller and (ii) a minimum of (a) the raw feedforward torque for the torque converter impeller and (b) the maximum torque for the torque converter impeller.

3. The system of claim 2, wherein the electrified powertrain further comprises an engine and a disconnect clutch that selectively connects the engine in series with the electric motor, and wherein the set of operating parameters includes a state of the disconnect clutch.

4. The system of claim 3, wherein the set of operating parameters further includes a state of the transmission and one or more shaft speeds or torques of the electrified powertrain.

5. The system of claim 1, wherein the control system is further configured to generate and maintain an adaptive feedforward torque converter (FTC) map or model using a Kalman filter.

6. The system of claim 5, wherein the control system is configured to utilize the adaptive FTC map or model to determine the raw feedforward torque for the torque converter impeller as a function of the speed of the torque converter turbine and the desired input speed for the torque converter.

7. The system of claim 1, wherein the control system is configured to control the electric motor based on the final feedforward torque for the torque converter impeller to provide optimal positive creep torque by the electrified powertrain.

8. The system of claim 7, wherein one of the set of operating parameters of the electrified powertrain is the enablement or activation of a creep mode.

9. An adaptive feedforward control method for an electrified powertrain including a torque converter, the method comprising:
- monitoring, by a control system and using a set of sensors, a set of operating parameters of the electrified powertrain, wherein the electrified powertrain includes an electric motor connected to an impeller of the torque converter and a transmission connected between a turbine of the torque converter and a driveline;
- determining, by the control system, a desired input speed for the torque converter based on the set of operating parameters of the electrified powertrain;
- determining, by the control system, minimum and maximum torques for the torque converter impeller based on the set of operating parameters of the electrified powertrain;
- determining, by the control system, a raw feedforward torque for the torque converter impeller based on the desired input speed for the torque converter and a speed of the torque converter turbine;
- determining, by the control system, a final feedforward torque for the torque converter impeller based on the raw feedforward torque for the torque converter impeller and the minimum and maximum torques for the torque converter impeller; and
- controlling, by the control system, the electric motor based on the final feedforward torque for the torque converter impeller.

10. The method of claim 9, wherein the determining of the final feedforward torque for the torque converter impeller includes determining a maximum of (i) the minimum torque for the torque converter impeller and (ii) a minimum of (a) the raw feedforward torque for the torque converter impeller and (b) the maximum torque for the torque converter impeller.

11. The method of claim 10, wherein the electrified powertrain further comprises an engine and a disconnect clutch that selectively connects the engine in series with the electric motor, and wherein the set of operating parameters includes a state of the disconnect clutch.

12. The method of claim 11, wherein the set of operating parameters further includes a state of the transmission and one or more shaft speeds or torques of the electrified powertrain.

13. The method of claim 9, further comprising generating and maintaining, by the control system, an adaptive feedforward torque converter (FTC) map or model using a Kalman filter.

14. The method of claim 13, further comprising utilizing the adaptive FTC map or model to determine the raw feedforward torque for the torque converter impeller as a function of the speed of the torque converter turbine and the desired input speed for the torque converter.

15. The method of claim 9, wherein the controlling of the electric motor based on the final feedforward torque for the torque converter impeller provides optimal positive creep torque by the electrified powertrain.

16. The method of claim 15, wherein one of the set of operating parameters of the electrified powertrain is the enablement or activation of a creep mode.

* * * * *